(12) United States Patent
Jacques et al.

(10) Patent No.: US 6,305,166 B1
(45) Date of Patent: Oct. 23, 2001

(54) MASTER CYLINDER WITH DYNAMICALLY ADJUSTABLE HYDRAULIC REACTION

(75) Inventors: Carré Jacques, Le Raincy; Cédric Leboisne, Paris, both of (FR)

(73) Assignee: Bosch Systemes de Freinage, Drancy (FR)

( * ) Notice: Subject to any disclaimer, the term of this patent is extended or adjusted under 35 U.S.C. 154(b) by 0 days.

(21) Appl. No.: 09/445,382

(22) PCT Filed: Oct. 26, 1999

(86) PCT No.: PCT/FR99/02594

§ 371 Date: Dec. 6, 1999

§ 102(e) Date: Dec. 6, 1999

(87) PCT Pub. No.: WO00/24624

PCT Pub. Date: May 4, 2000

(30) Foreign Application Priority Data

Oct. 26, 1998 (FR) .................................................. 98 13408

(51) Int. Cl.[7] ..................................................... B60T 13/20
(52) U.S. Cl. ............................................................... 60/553
(58) Field of Search ........................................ 60/552, 553

(56) References Cited

U.S. PATENT DOCUMENTS

| | | | |
|---|---|---|---|
| 5,921,084 | * | 7/1999 | Gautier et al. ........................... 60/553 |
| 5,941,071 | * | 8/1999 | Simon Bacardit ....................... 60/553 |
| 6,079,208 | * | 6/2000 | Verbo et al. ............................. 60/553 |

* cited by examiner

*Primary Examiner*—Edward K. Look
*Assistant Examiner*—Thomas E. Lazo
(74) *Attorney, Agent, or Firm*—Leo H. McCormick, Jr.; Warren Comstock

(57) ABSTRACT

A hydraulic-reaction master cylinder (2) having a working chamber (12) in which slides a hollow main piston (13) with a bore (130) therein which retains a reaction piston (14) to define a reaction chamber (15). The reaction chamber (15) has an annular shape and communicates with the working chamber (12) through at least one non-return valve (22) or an axial passage (23). The axial passage (23) is closed off selectively an axial stub (141) that extends from the reaction piston (14).

2 Claims, 3 Drawing Sheets

MASTER CYLINDER WITH DYNAMICALLY ADJUSTABLE HYDRAULIC REACTION

The present invention relates to a hydraulic-reaction master cylinder comprising: a cylindrical body delimiting a variable-volume working chamber filled with a brake fluid; a main piston mounted so that it can slide selectively in the working chamber in a first axial direction to reduce the volume of this working chamber; an axial bore pierced in the main piston and delimiting a variable-capacity reaction chamber subject to a variable pressure; a reaction piston closing the reaction chamber and mounted so that it can slide selectively in the axial bore in the first axial direction to reduce the capacity of the reaction chamber; and a non-return valve selectively allowing fluid to flow from the reaction chamber to the working chamber, the reaction chamber being annular in shape and communicating selectively with the working chamber through an axial passage or through the non-return valve, the reaction piston being stepped and having an axial stub, capable of selectively closing off the axial passage.

BACKGROUND OF THE INVENTION

A master cylinder of this type is incorporated into the braking device described in the prior art by patent EP—0,662,894.

Such a braking device has the advantage of optimizing the intensity of the braking force in the event of an abrupt application of the brakes, particularly by delaying the rise in reaction force that opposes this braking force.

More recently, in the design of braking systems, there has arisen the desire to be able to vary the reaction force in inverse proportion to the gradient of the braking effort, so as to optimize the use of braking energy exerted by the driver in the event of intense and sharp braking.

SUMMARY OF THE INVENTION

The present invention falls within this context and its object is to provide a hydraulic-reaction master cylinder which has a simple structure and offers this feature.

To this end, the master cylinder of the present invention, which in other respects is in accordance with the generic definition given in the above preamble, is essentially characterized in that the valve is annular in shape and comprises a sealing cup held in an annular cage which defines the axial passage and which is pierced with axial orifices selectively allowing fluid to flow from the reaction chamber to the working chamber by deformation of, and flow around, the cup.

According to one possible embodiment of the invention, the stub may be passed through by a drilling which communicates with the reaction chamber, the non-return valve being installed on one end of the drilling, which communicates with the working chamber.

Other features and advantages of the invention will emerge clearly from the description thereof given hereafter by way of non-limiting indication, with reference to the appended drawings.

DETAILED DESCRIPTION OF THE INVENTION

Figure 1:
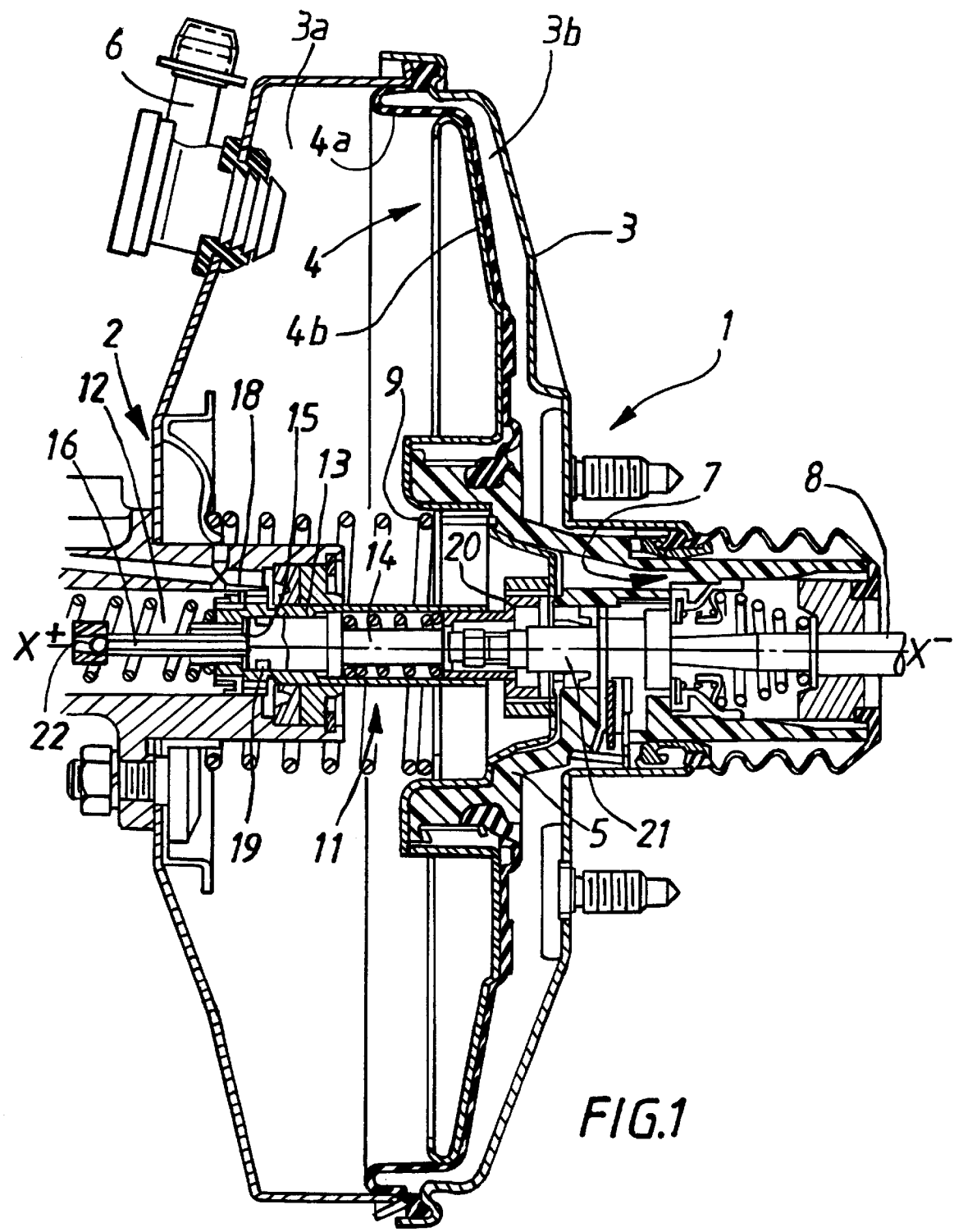
FIG. 1 is a view in section of the known braking device described in the aforementioned patent EP—0,66,894.

The prior-art patent EP—0,662,894 describes a braking system which, schematically, comprises a pneumatic booster 1 and a master cylinder 2.

The booster itself comprises a rigid casing 3 divided into two chambers 3a and 3b in a leaktight manner by a moving partition 4 consisting of a diaphragm 4a and a rigid skirt 4b, and capable of carrying along a pneumatic piston 5 that can move inside the casing 3.

The front chamber 3a, the front ace of which is closed in a leaktight manner by the master cylinder 2 is permanently connected to a source of partial vacuum (not depicted) through a coupling 6.

The pressure in the rear chamber 3b is controlled by a pneumatic valve 7, operated by an operating rod 8, which is connected to a brake pedal (not depicted).

When the operating rod 8 is in the position of rest, in this case pulled over to the right as shown in FIG. 1, the pneumatic valve 7 establishes communication between the two chambers 3a and 3b of the booster.

As the rear chamber 3b is then subject to the same partial vacuum as the front chamber 3a, the piston is pushed over to the right, in the position of rest, by a spring 9.

Actuating the operating rod 8 to the left has the effect, first of all, of shifting the pneumatic valve 7 in such a way that it isolates the chambers 3a and 3b from one another and then, secondly, of shifting this pneumatic valve in such a way that it opens the rear chamber 3b to atmospheric pressure.

The pressure difference between the two chambers then felt by the diaphragm 4a exerts on the moving partition 4 a thrust which tends to shift it to the left and allow it to carry along the piston 5 which in turn shifts, compressing the spring 9.

The braking effort exerted on the operating rod 8, or "input forces", and the brake-boosting force or "boost force" resulting from the thrust of the moving partition 4, are then applied together in the axial direction X–X+ of the pushrod 8 in the direction of the master cylinder 2 and combine to form the force that actuates the latter.

More specifically, the actuating force is applied to the entire piston 11 of the master cylinder and causes a movement to the left (in FIG. 1) in the axial direction X–X+, which leads to a rise in the pressure of the brake fluid present in the working chamber 12 of the master cylinder and actuation of the brake connected to this chamber.

The entire piston 11 is in fact composite and is made up of a main piston 13 pierced with an axial bore 130 closed in a leaktight manner by a reaction piston 14 and an annular seal 19.

The reaction piston 14 is mounted so that it can slide in the bore 130 in the axial direction X–X+ and against the force exerted by a spring 24. This piston 14 delimits within the bore 130 a reaction chamber 15 which communicates with the working chamber 12 through a non-return valve 22 and through a duct 131 formed in the front part of the main piston 13.

As described in patent EP—0,662,894, the non-return valve 22 has the function of selectively allowing brake fluid to flow from the reaction chamber 15 to the working chamber 12.

Outside of the passage of fluid allowed by the non-return valve 22 between the working chamber 12 of the master cylinder 2 and the reaction chamber 15, the main piston 13 slides in a leaktight manner in the master cylinder 2, sealing being achieved by virtue of at least one annular seal 18.

The main piston 13 is connected, for example via a ring 20, to the rigid skirt 4b, so that it can receive at least part of the boost force exerted via this skirt.

The reaction piston 14 for its part is arranged axially, facing a pushrod 21 capable of transmitting to it at least the input force exerted on the operating rod 8, to the left in the figures.

According to the invention, the reaction piston 14 is stepped in such a way as to bear an axial stub 141, and the reaction chamber 15, which is annular in shape, communicates with the working chamber 12 either through the non-return valve 22 or through an axial passage 23, depending on whether or not the axial stub is closing off this axial passage 23, this closing-off taking place when the reaction piston is actuated with sufficient speed and sufficient force to undergo a predetermined minimum relative displacement with respect to the pneumatic piston 5.

As the axial stub 141 has, by definition, a cross-sectional area smaller than the area of the main cross section of the reaction piston 14, the ratio of the reaction force received by this reaction piston 14 when the axial passage 23 is closed off to the reaction force received by this same piston 14 when the axial passage 23 is not closed off is equal to the ratio of the cross-sectional area of the stub 141 to the area of the main cross section of the reaction piston, the reaction force therefore being substantially reduced when the reaction piston is actuated sharply.

Figure 2:
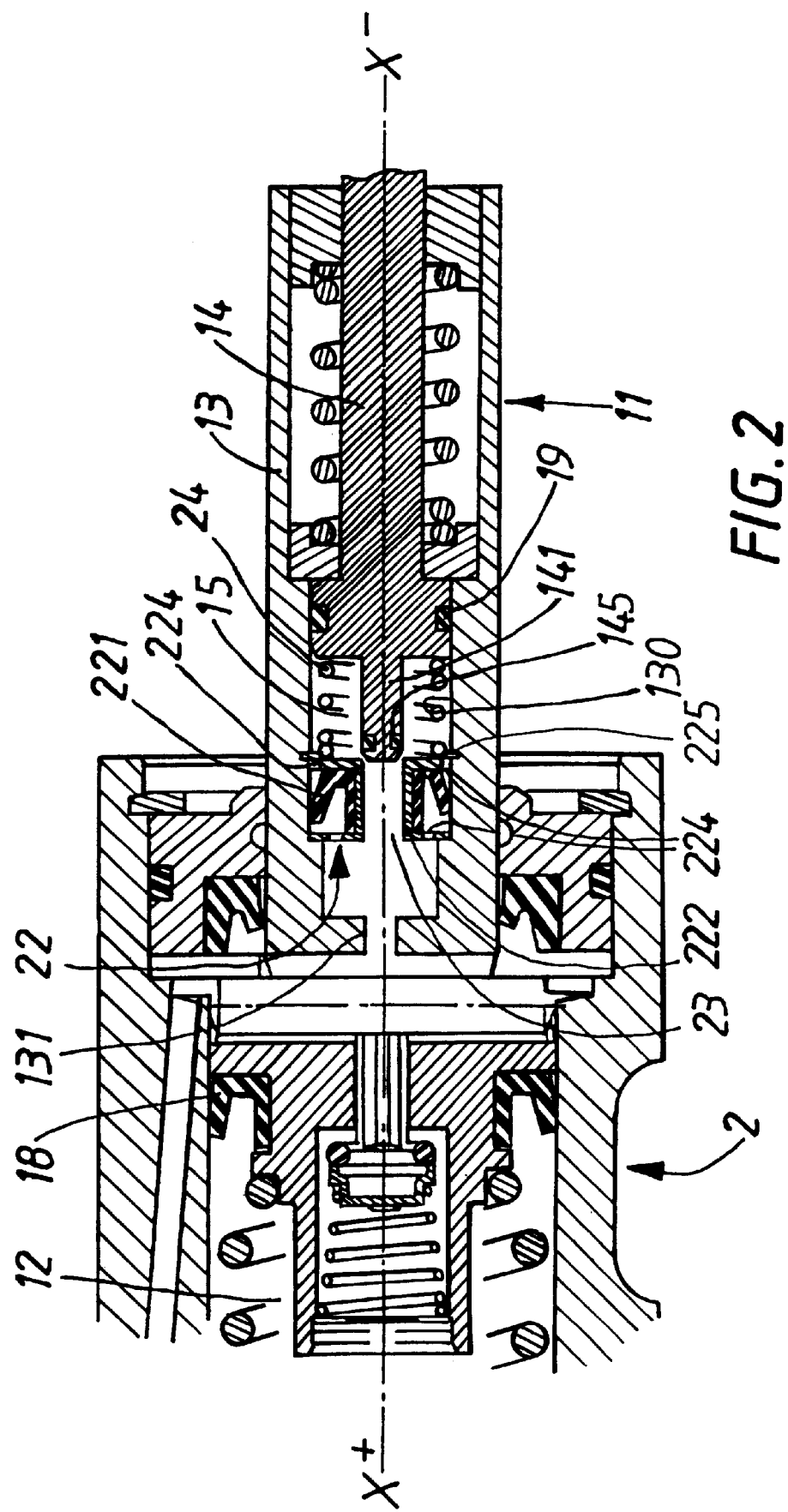
FIG. 2 is a view in section of the specific components of the master cylinder of the invention, according to a first embodiment thereof.

According to a first possible embodiment of the invention, illustrated in FIG. 2, the valve 22 is annular in shape and comprises a sealing cup 221 which is held in an annular cage 222 secured to the main piston 13 by virtue of stop pieces such as 225.

Via its central recess, the annular cage 222 defines the axial passage 23 and is pierced with axial orifices 224 which allow fluid to flow from the reaction chamber 15 to the working chamber 12 by deformation of, and flow around, the cup 221 when the stub 141 enters the axial passage and closes it off in a leaktight manner by virtue of the annular seal 145 borne by this stub.

Figure 3:
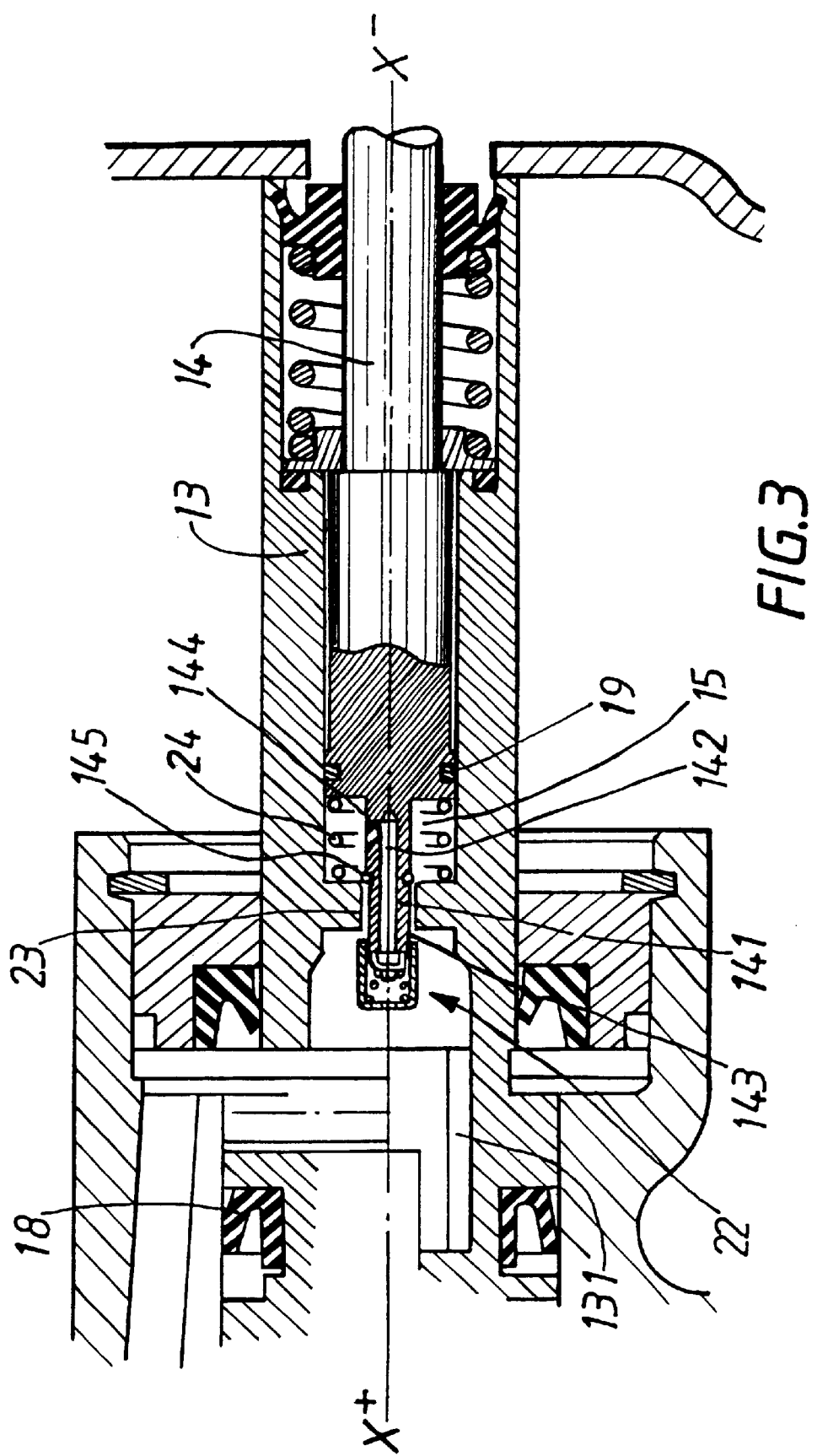
FIG. 3 is a view in section of the specific components of the master cylinder of the invention, according to a second embodiment thereof.

According to a second possible embodiment of the invention, illustrated in FIG. 3, the stub 141 has passing through it a drilling 142 which communicates with the reaction chamber 15 via a duct 144, and the non-return valve 22 is installed on one end 143 of the drilling 142, which is a: the same pressure as the working chamber 12.

The axial passage 23 is therefore defined in the main piston 13 itself, and is selectively closed off by the stub 141, by virtue of the annular seal 145 borne thereby, depending on the speed and force with which the reaction piston 14 is actuated.

We claim:

1. A hydraulic-reaction master cylinder comprising:
    a cylindrical body delimiting a variable-volume working chamber filled with a brake fluid;
    a main piston mounted to selectively slide in said working chamber in a first axial direction to reduce the volume of said working chamber, said main piston being pierced with an axial bore, said axial bore being delimiting a variable-capacity reaction chamber subject to a variable pressure;
    a reaction piston closing said reaction chamber and mounted to slide in said axial bore in said first axial direction to reduce the capacity of said reaction chamber; and
    a non-return valve selectively allowing fluid to flow from said reaction chamber to said working chamber, said reaction chamber being annular in shape and communicating selectively with said working chamber through an axial passage or through said non-return valve, said reaction piston being stepped and having an axial stub for selectively closing off said axial passage, said non-return valve being characterised by being annular in shape and having a sealing cup held in an annular cage which defines said axial passage, said sealing cup being pierced with axial orifices for selectively allowing fluid to flow from said reaction chamber to said working chamber by being deformed to allow fluid to flow around said sealing cup.

2. The master cylinder as recited in claim 1 wherein said stub is characterised by a drilling which passes through the stub which communicates with the reaction chamber and in that said non-return valve is installed in one end of said drilling to provide communication with said working chamber.

* * * * *